US012671623B1

(12) United States Patent　　　(10) Patent No.:　US 12,671,623 B1

Guberman et al.　　　　　　　　　(45) **Date of Patent:　*Jun. 30, 2026**

---

(54) LIFE-CYCLE BRIDGES (LCB)

(71) Applicant: Bank of America Corporation,
Charlotte, NC (US)

(72) Inventors: Arthur Guberman, Freehold, NJ (US);
Lester E. Wolfgang, St. Augustine, FL
(US)

(73) Assignee: Bank of America Corporation,
Charlotte, NC (US)

( * ) Notice: Subject to any disclaimer, the term of this
patent is extended or adjusted under 35
U.S.C. 154(b) by 46 days.

This patent is subject to a terminal dis-
claimer.

(21) Appl. No.: 19/007,497

(22) Filed: Jan. 1, 2025

(51) Int. Cl.
 *H04L 41/0631* 　　　(2022.01)
 *H04L 43/04* 　　　　(2022.01)

(52) U.S. Cl.
 CPC .......... *H04L 41/0645* (2013.01); *H04L 43/04*
 (2013.01)

(58) Field of Classification Search
 CPC ........................... H04L 41/0645; H04L 43/04
 USPC ........................................................ 709/224
 See application file for complete search history.

(56) References Cited

U.S. PATENT DOCUMENTS

| | | | |
|---|---|---|---|
| 9,658,081 B2 * | 5/2017 | Vaswani | ................ G01D 4/004 |
| 11,403,393 B1 * | 8/2022 | Satish | ................... G06F 21/554 |
| 11,902,117 B1 | 2/2024 | Guberman et al. | |
| 2018/0075397 A1 * | 3/2018 | Ronen | ........... G06Q 10/063114 |
| 2019/0278646 A1 * | 9/2019 | Fernandez | ........... G06F 11/079 |
| 2020/0192743 A1 * | 6/2020 | Harper | ............... G06F 11/0793 |
| 2021/0081265 A1 * | 3/2021 | Mariyappa | ........... G06F 9/5072 |
| 2022/0066856 A1 * | 3/2022 | Agarwal | ................ H04L 51/23 |
| 2022/0311655 A1 * | 9/2022 | Han | ................... G06Q 10/0639 |

* cited by examiner

*Primary Examiner* — Ario Etienne
*Assistant Examiner* — Kidest Mendaye
(74) *Attorney, Agent, or Firm* — Weiss & Arons LLP

(57) ABSTRACT

Virtual monitoring of a set of computing devices by receiv-
ing a report of a service outage incident, arranging a
life-cycle electronic bridge to respond to the outage incident,
and transmitting an API call to a WebEx bridge platform
requesting all electronic bridge information. Bridge infor-
mation includes bridges currently being hosted by the bridge
platform. The API requests responders that are currently not
involved in at least one of the plurality of electronic bridges.
The method identifies responders that can respond to the
incident, are not among responders involved in at least one
of the bridges, and are listed on the WebEx bridge platform.
The method adds the bridge platform to those that are
currently hosted by the platform, and determines a root
cause for each outage report. For each root cause, the
platform determines an average life-cycle and terminates the
bridge at an expiry time of the average life-cycle.

19 Claims, 13 Drawing Sheets

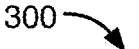
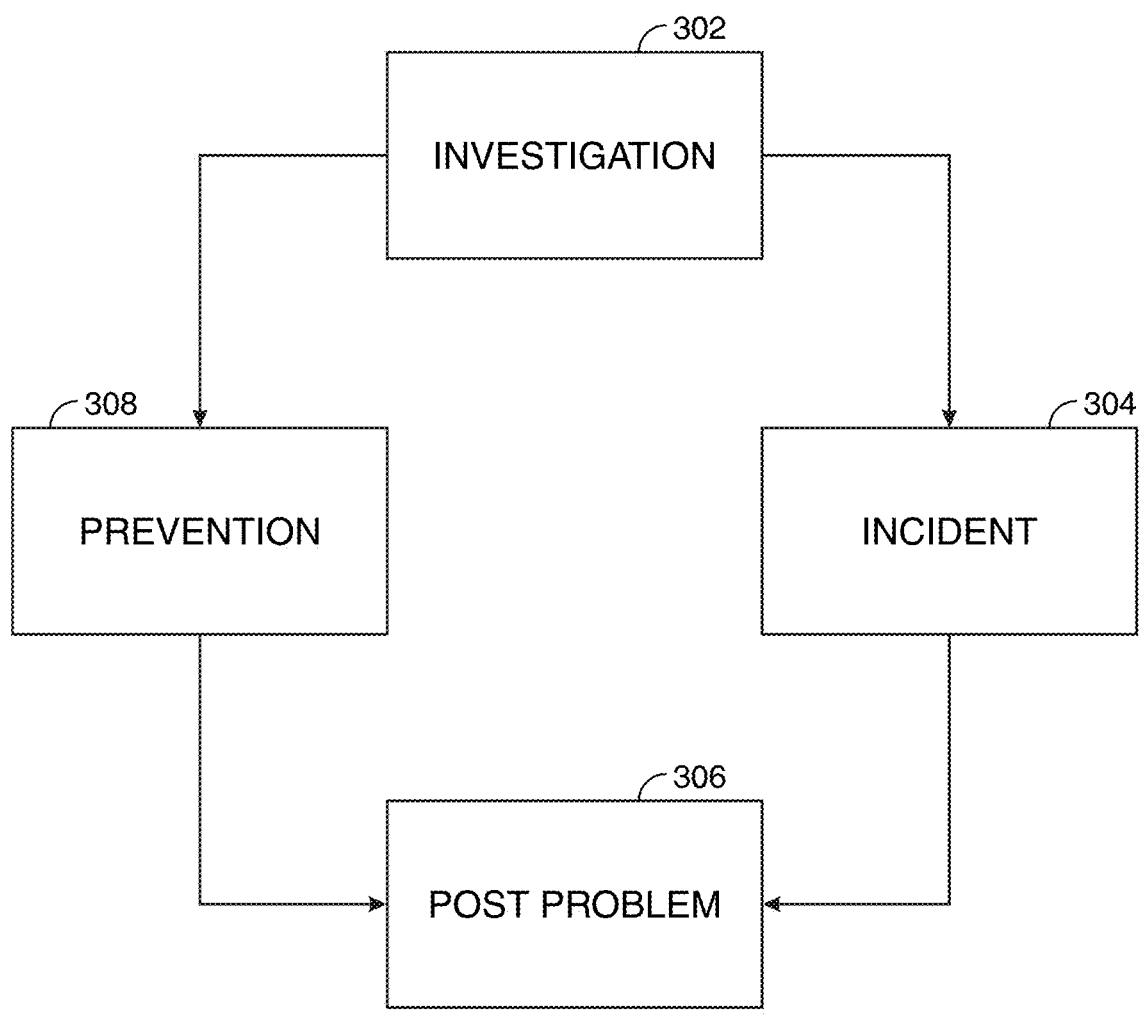
FIG. 3

Incident Number: LCB000000000507  |  AIT Number: 0 — 602

△ Bridge Details — 604

| Brief Description | |
|---|---|
| Customer Experience: | Customer impact currently being confirmed by operations/support teams. |
| Status Update: | As of 15:40 on 11/12/2024: Engaging production support and operations teams for triage and investigation. |

606

| Reservation Call Type: | Prevention |
|---|---|
| Webex: | Join Here ⊙ ◻ ⌨ ◯ ⌂ 🖳 |
| Workroom (Mattermost): | LCB000000000507 |

608

| Linked TicketID Impacted AIT: | |
|---|---|
| Impact Status: | Active |
| Owned By: | APS Others |

612

| Call Leader: | |
|---|---|
| Incident Manager: | John Doe (ABC Others) |
| Region: | |
| Domains involved: | |

610

| Heightened Awareness: | No |
|---|---|
| Priority: | NA |
| Impact: | NA |
| Urgency: | NA |
| Special Event: | No |

614

| Caused by Change: | |
|---|---|
| Event Start: | |
| Bridge Start: | 11/12/2024  15:40 |
| In Recess: | No |
| Network Engaged: | |

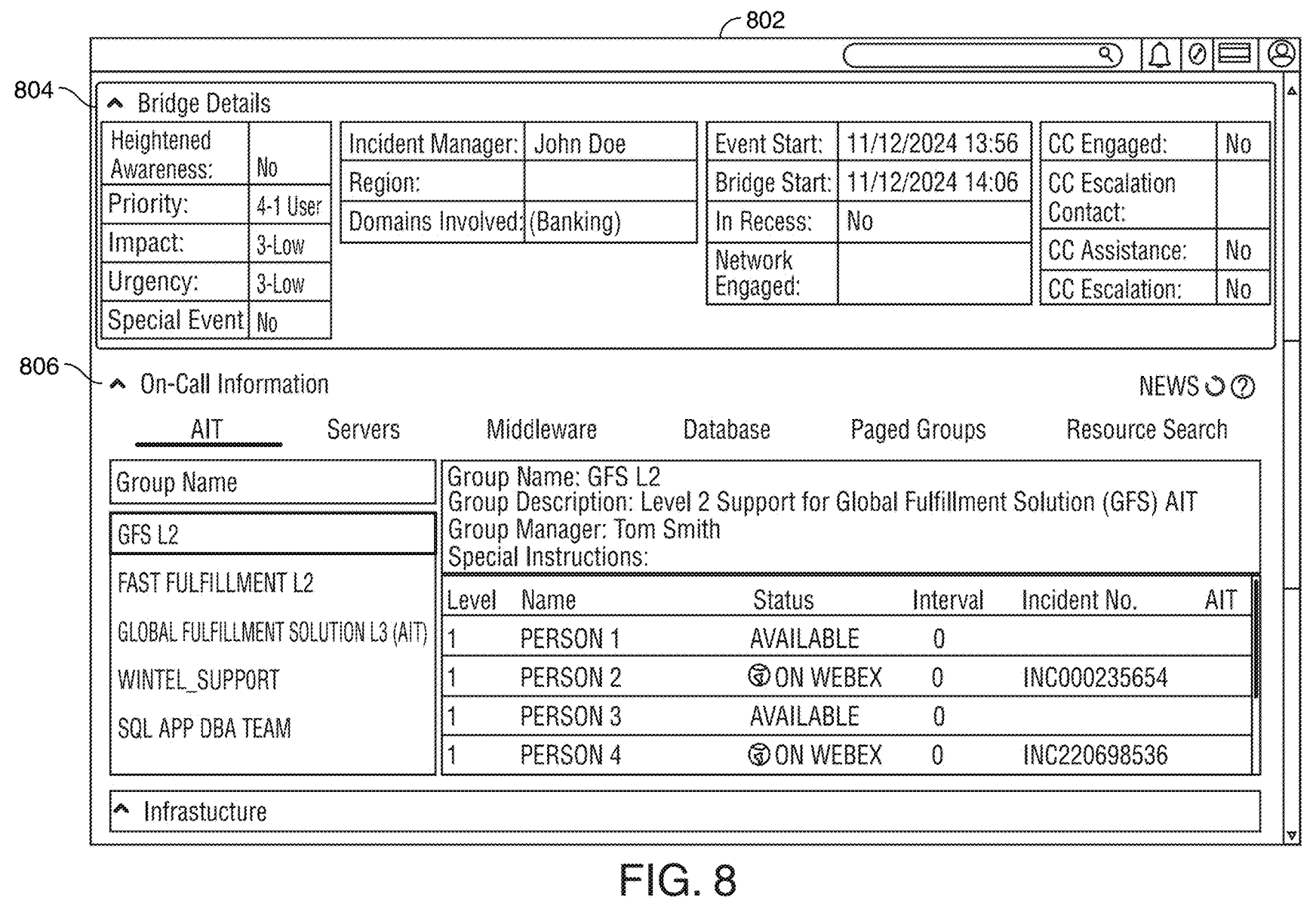

Bridge Details (804)

| Heightened Awareness: | No | Incident Manager: | John Doe | Event Start: | 11/12/2024 13:56 | CC Engaged: | No |
| Priority: | 4-1 User | Region: | | Bridge Start: | 11/12/2024 14:06 | CC Escalation Contact: | |
| Impact: | 3-Low | Domains Involved: | (Banking) | In Recess: | No | CC Assistance: | No |
| Urgency: | 3-Low | | | Network Engaged: | | CC Escalation: | No |
| Special Event: | No | | | | | | |

On-Call Information (806)

AIT    Servers    Middleware    Database    Paged Groups    Resource Search    NEWS Group Name
- GFS L2
- FAST FULFILLMENT L2
- GLOBAL FULFILLMENT SOLUTION L3 (AIT)
- WINTEL_SUPPORT
- SQL APP DBA TEAM Group Name: GFS L2
Group Description: Level 2 Support for Global Fulfillment Solution (GFS) AIT
Group Manager: Tom Smith
Special Instructions:

| Level | Name | Status | Interval | Incident No. | AIT |
|---|---|---|---|---|---|
| 1 | PERSON 1 | AVAILABLE | 0 | | |
| 1 | PERSON 2 | ON WEBEX | 0 | INC000235654 | |
| 1 | PERSON 3 | AVAILABLE | 0 | | |
| 1 | PERSON 4 | ON WEBEX | 0 | INC220698536 | |

Infrastructure

FIG. 8

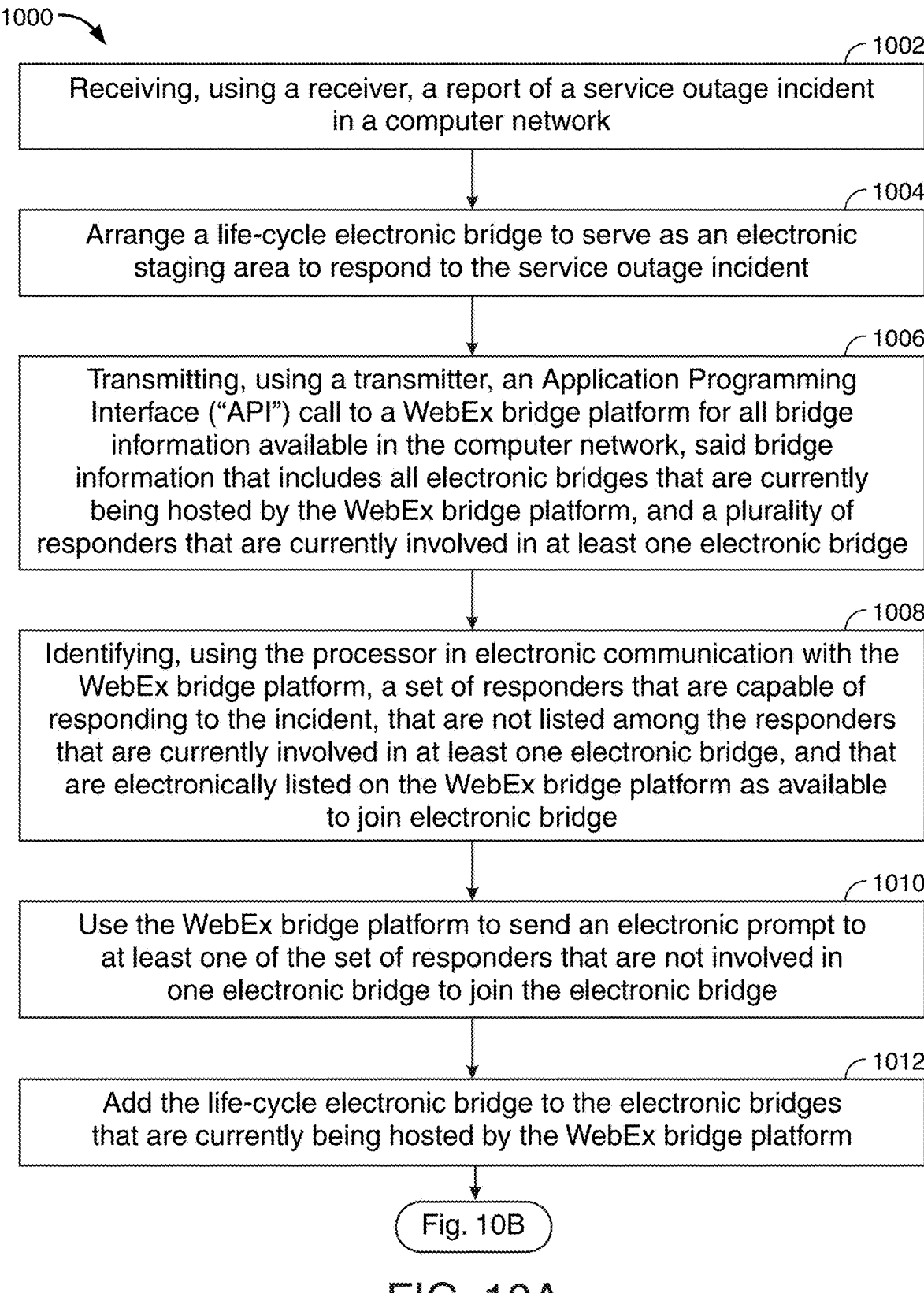

1000

1002

Receiving, using a receiver, a report of a service outage incident in a computer network

1004

Arrange a life-cycle electronic bridge to serve as an electronic staging area to respond to the service outage incident

1006

Transmitting, using a transmitter, an Application Programming Interface ("API") call to a WebEx bridge platform for all bridge information available in the computer network, said bridge information that includes all electronic bridges that are currently being hosted by the WebEx bridge platform, and a plurality of responders that are currently involved in at least one electronic bridge

1008

Identifying, using the processor in electronic communication with the WebEx bridge platform, a set of responders that are capable of responding to the incident, that are not listed among the responders that are currently involved in at least one electronic bridge, and that are electronically listed on the WebEx bridge platform as available to join electronic bridge

1010

Use the WebEx bridge platform to send an electronic prompt to at least one of the set of responders that are not involved in one electronic bridge to join the electronic bridge

1012

Add the life-cycle electronic bridge to the electronic bridges that are currently being hosted by the WebEx bridge platform

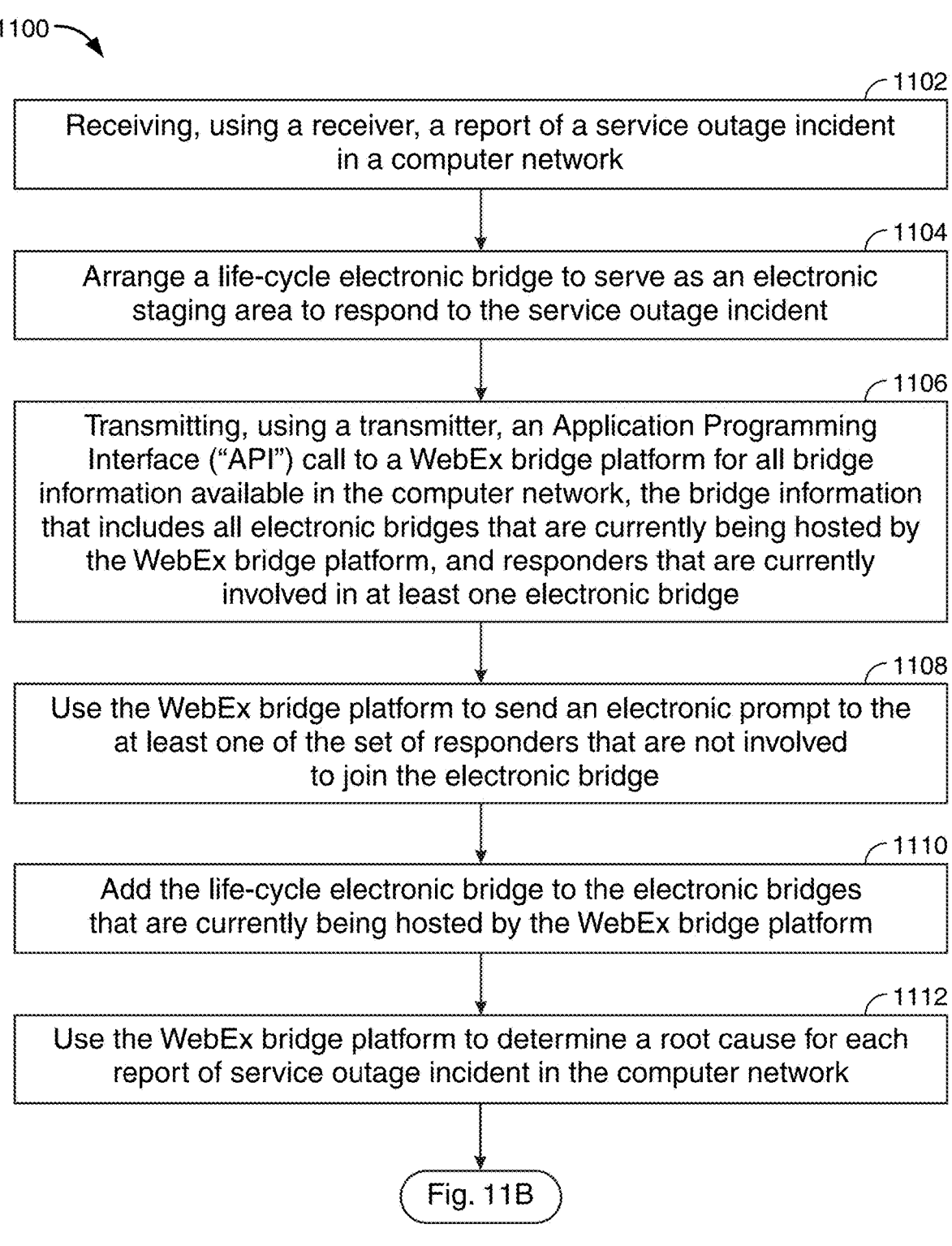

1100

1102

Receiving, using a receiver, a report of a service outage incident in a computer network

1104

Arrange a life-cycle electronic bridge to serve as an electronic staging area to respond to the service outage incident

1106

Transmitting, using a transmitter, an Application Programming Interface ("API") call to a WebEx bridge platform for all bridge information available in the computer network, the bridge information that includes all electronic bridges that are currently being hosted by the WebEx bridge platform, and responders that are currently involved in at least one electronic bridge

1108

Use the WebEx bridge platform to send an electronic prompt to the at least one of the set of responders that are not involved to join the electronic bridge

1110

Add the life-cycle electronic bridge to the electronic bridges that are currently being hosted by the WebEx bridge platform

1112

Use the WebEx bridge platform to determine a root cause for each report of service outage incident in the computer network

For each root cause:

1116

Use the WebEx bridge platform to determine an average life-cycle for an electronic bridge formed in response to the report of a service outage associated with the root cause

1118

Terminate the electronic bridge at an expiry time of the average life-cycle

LIFE-CYCLE BRIDGES (LCB)

FIELD OF THE DISCLOSURE

Aspects of this disclosure relate to monitoring and mitigating Information Technology (IT) incidents. Specifically, the disclosure relates to monitoring and mitigating IT incidents that causes a loss of service.

BACKGROUND OF THE DISCLOSURE

Internal technology (IT) support teams typically do not have any access into ongoing investigations conducted by other support teams. Nor does software that is dedicated to arranging and forming these IT support team bridges, such as Virtual On-Watch as described in U.S. Pat. No. 11,902, 117, filed on Nov. 18, 2022, and entitled, "Virtual On-Watch", which is hereby incorporated by reference herein in its entirety, structure information related to multiple bridges.

It would be desirable to provide systems and methods that structure information related to multiple bridges.

It would be further desirable to provide systems and methods that capture and retrieve, automatically and/or upon command, resources dedicated to ongoing, past and future bridges.

It would be further desirable to provide systems and methods that analyze time and efforts dedicated to ongoing, past and future bridges.

SUMMARY OF THE DISCLOSURE

It is an object of this disclosure to provide automated systems and methods for running investigations, preventions and post-mortem bridges for use by support and development teams and for review by command centers associated with such teams.

It is a further object of this disclosure to capture activities and provide analytics related to running investigations, preventions and post-mortem bridges for use by support and development teams. Such analytics, and provision of technical solutions based thereon, may leverage machine learning-based and Artificial Intelligence (AI)-based self-healing algorithms. The AI algorithms may relate to recurrent problems and resources expended that have occurred with respect to such bridges.

Pursuant to the objects set forth above, an end-to-end triage management process that provides early indication of upcoming triages is disclosed herein. Such a process may include a method for providing virtual monitoring of a set of computing devices. The method may include receiving a report of a service outage incident in a computer network.

A targeted response to such a report may include arranging a life-cycle electronic bridge to serve as an electronic staging area to respond to the service outage incident. The response may also include transmitting, using a transmitter, an Application Programming Interface (API) call to a WebEx bridge platform for all bridge information available in the computer network. The bridge information may include all of a plurality of electronic bridges that are currently being hosted by the WebEx bridge platform. The bridge information may further include identification of a plurality of responders that are currently involved in at least one of the plurality of electronic bridges, and a plurality of responders who are not involved in any electronic bridges.

The method may further include identifying, possibly using the processor in electronic communication with the WebEx bridge platform, a set of responders that are capable of responding to the incident, that are listed among the responders that are not currently involved in at least one of the plurality of electronic bridges, and that are electronically listed on the WebEx bridge platform as available to join electronic bridge. Such identifying may include forming an array of responders based on a number—e.g., a total number of available responders—and a qualification level of the responders.

In response to receiving a greater than threshold level of a pre-determined metric associated with the service outage incident, the method may increase (or otherwise adjust-such as by decreasing), proportionally to the pre-determined metric, the requested number and/or qualification level of the responders. In some embodiments, the array of responders may be selected from a group of responders that is larger than the array of responders.

Some embodiments may involve using the WebEx bridge platform to send an electronic prompt to the at least one of the set of responders to join the electronic bridge. Then, or substantially simultaneously thereto, the method may add the WebEx bridge platform to the plurality of electronic bridges that are currently being hosted by the WebEx bridge platform.

The method may use the WebEx bridge platform to determine a root cause for each report of service outage incident in the computer network. For each root cause, the method may use the WebEx bridge platform to determine an average life-cycle for an electronic bridge formed in response to the report of a service outage associated with the root cause. Finally, the method may terminate, for each root cause, the electronic bridge at an average expiry time of the average life-cycle determined for the root cause.

The method may include increasing proportionally to a percentage amount of the computer network affected by the service outage incident the number and/or qualification level of the responders. The method may include increasing proportionally to a percentage amount of the computer network affected by the service outage incident the number and/or qualification level of the responders.

The method may include increasing proportionally to a percentage amount of computer systems in the computer network affected by the service outage incident the number and/or qualification level of the responders.

The method may include increasing proportionally to a magnitude of types of systems affected by the service outage incident the number and/or qualification level of the responders.

The method may include increasing proportionally to a criticality of systems affected by the service outage incident the number and/or qualification level of the responders. In some embodiments, the criticality of systems may be determined based at least in part on whether the systems are end consumer-facing or not.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3 shows an illustrative flow diagram in accordance with the principles of the disclosure;

FIG. 6 shows another illustrative bridge detail report in accordance with the principles of the disclosure;

FIG. 8 shows an illustrative group information screen;

FIGS. 10A-B shows illustrative flow diagrams according to the principles of the disclosure.

DETAILED DESCRIPTION OF THE DISCLOSURE

Figure 1:
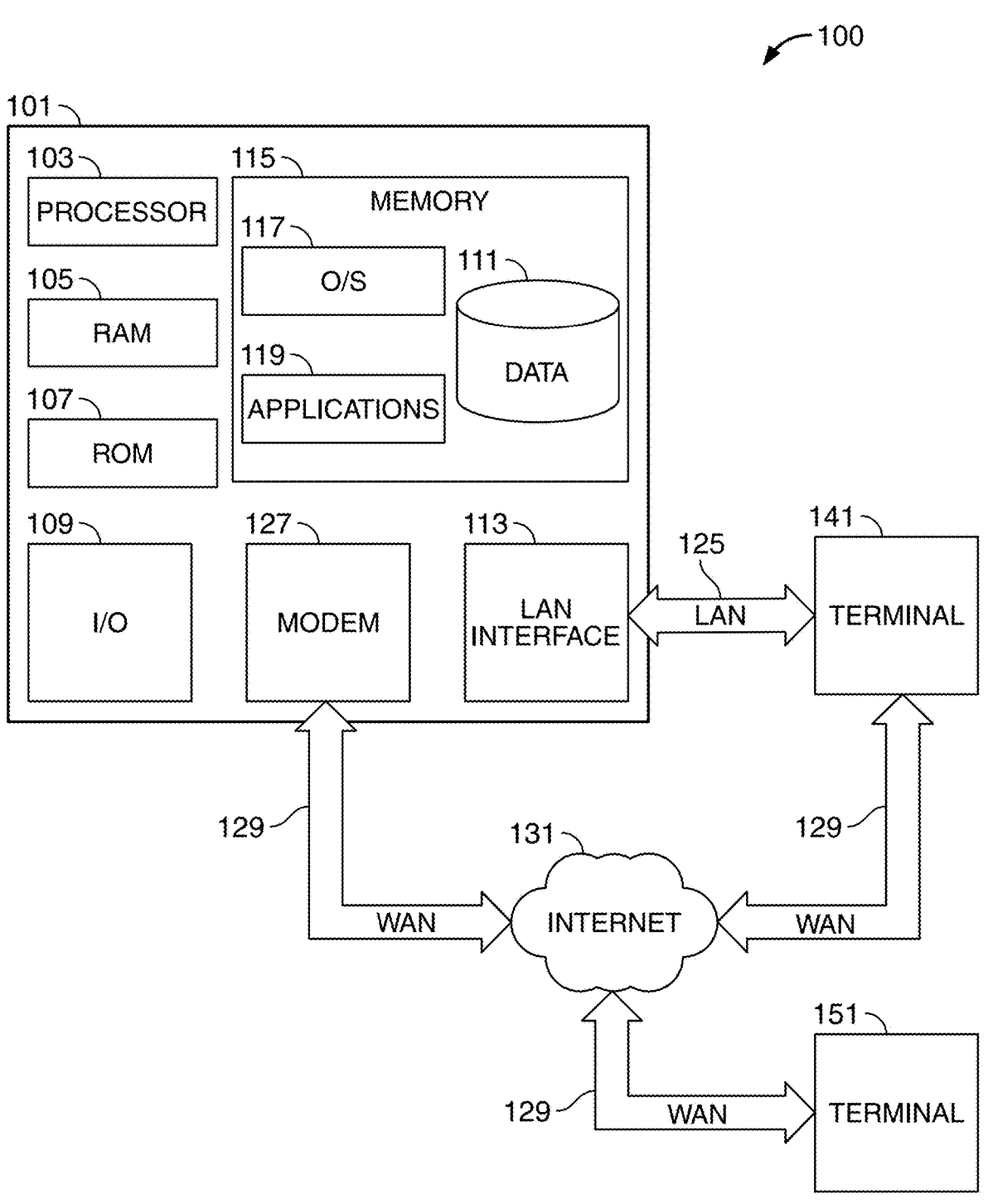
FIG. 1 shows illustrative apparatus in accordance with principles of the disclosure.

A system may perform virtual monitoring of a set of computing devices as follows. The system may include a receiver for receiving a report of a service outage incident in a computer network. The system may include a life-cycle electronic bridge. The electronic bridge may serve as an electronic staging area to respond to the service outage incident. The system may include a transmitter for transmitting an Application Programming Interface (API) call for all bridge information available in the computer network. The system may also include a WebEx bridge platform. The WebEx bridge platform may be operable to receive the API call for bridge information. The bridge information may include all of a plurality of electronic bridges that are currently being hosted by the WebEx bridge platform. The bridge information may include a plurality of responders that are currently involved in at least one of the plurality of electronic bridges.

The processor may be in electronic communication with the WebEx bridge platform. The set of responders should be capable of responding to the incident, should not be listed among the plurality of responders that are currently involved in at least one of the plurality of electronic bridges, and should be electronically listed on the WebEx bridge as available to join the life-cycle electronic bridge.

In some embodiments, the WebEx bridge platform may be further configured to send an electronic prompt to the at least one of the set of responders to join the life-cycle electronic bridge and to add the life-cycle electronic bridge to the plurality of electronic bridges that are currently being hosted by the WebEx bridge platform.

The processor may be further operable to determine a root cause for each report of service outage incident in the computer network. For each root cause, the WebEx bridge platform may be configured to determine an average number of responders for an electronic bridge formed in response to the report of a service outage associated with the root cause. Based on the determination, the WebEx bridge platform may adjust the response to the API call to be in electronic communication to obtain the average number of responders. For each root cause, the life-cycle electronic bridge may be operable to determine an average duration of the life-cycle electronic bridge. Based on the average duration of the life-cycle electronic bridge for each root cause, the life-cycle electronic bridge may determine an expiry time, and then, terminate at the expiry time, the life-cycle bridge.

In some embodiments, an average life-cycle for a bridge event may include a bridge start date/time and a bridge expiry date/time. The WebEx bridge platform may be further operable to determine, between the bridge start date/time and the bridge expiry date/time, peak activity intervals. Such peak activity intervals may be useful in throttling up or down the number of responders active on the bridge.

The WebEx bridge platform may be further operable to determine for each root cause, preferably prior to the arranging of the electronic bridge, whether a legacy electronic bridge exists that relates to each root cause.

When a legacy electronic bridge that relates to a root cause exists, the WebEx bridge platform may be further operable to classify the legacy electronic bridge that relates to the root cause as relational to the root cause, and flag the legacy electronic bridge with a root cause flag. The root cause flag identifies the root cause to which the legacy electronic bridge is directed.

The WebEx bridge platform may be further operable to add the electronic bridge to a set of legacy electronic bridges that all relate to the root cause.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/ output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
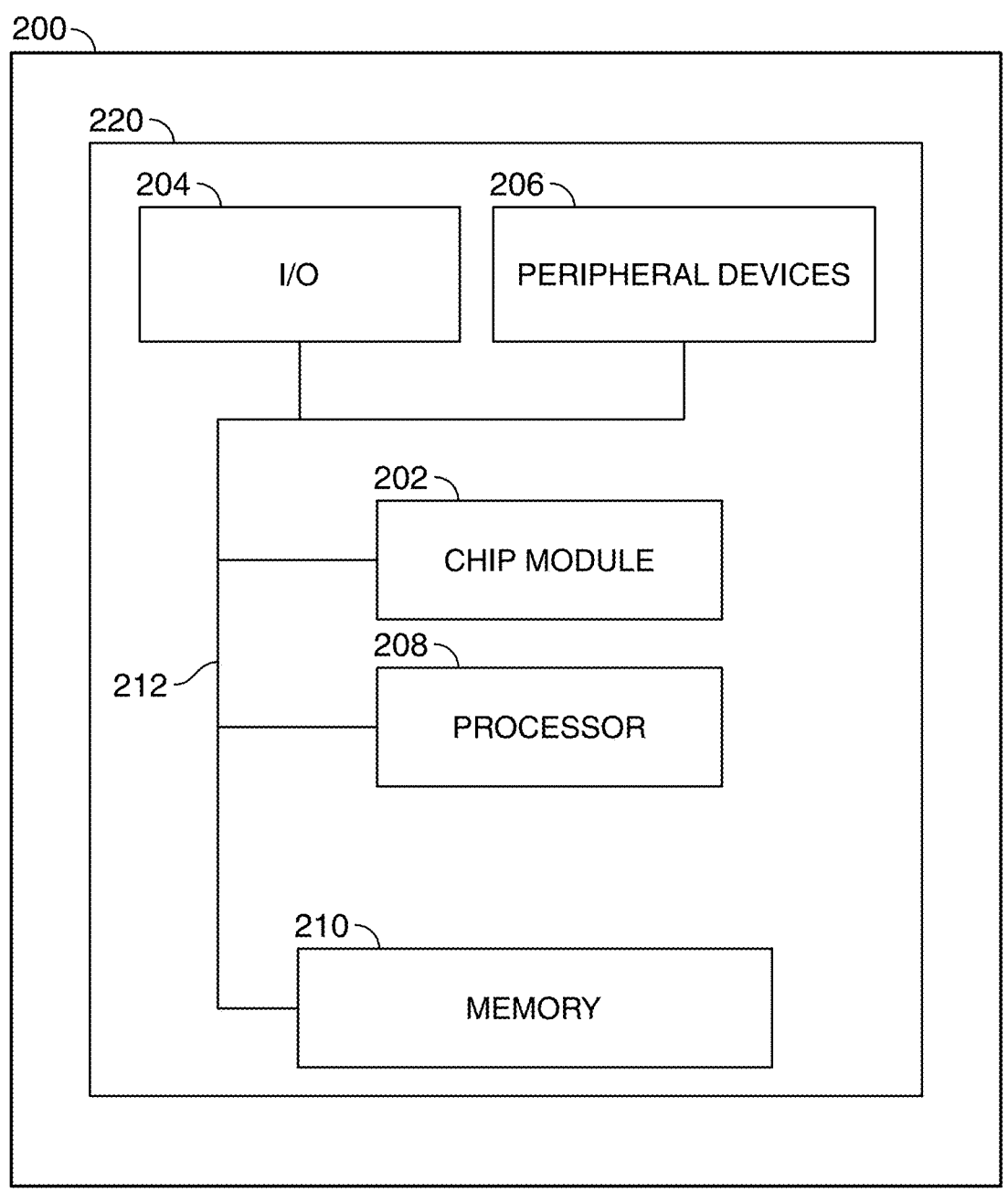
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

FIG. 3 shows an illustrative flow diagram of a life cycle bridge flow in accordance with the principles of the disclosure. At the beginning of the life-cycle, an investigation 302 of an incident is initiated. Investigation 302 may lead to one or more outcomes.

Investigation 302 may lead to creating a bridge to deal with an incident 306.

Investigation 302 may lead to taking steps to prevent further incidents, as shown at prevention 304.

Either prevention step 304 or incident 306 or both prevention step 304 and incident 306 may lead to a post-problem analysis as shown at 308. Post-problem analysis 308 may utilize AI analysis to make corrections to future investigation, and responses based thereon or tuned thereto, in order to implement corrective, possibly self-healing, measures to avoid future incidents.

Figure 4:
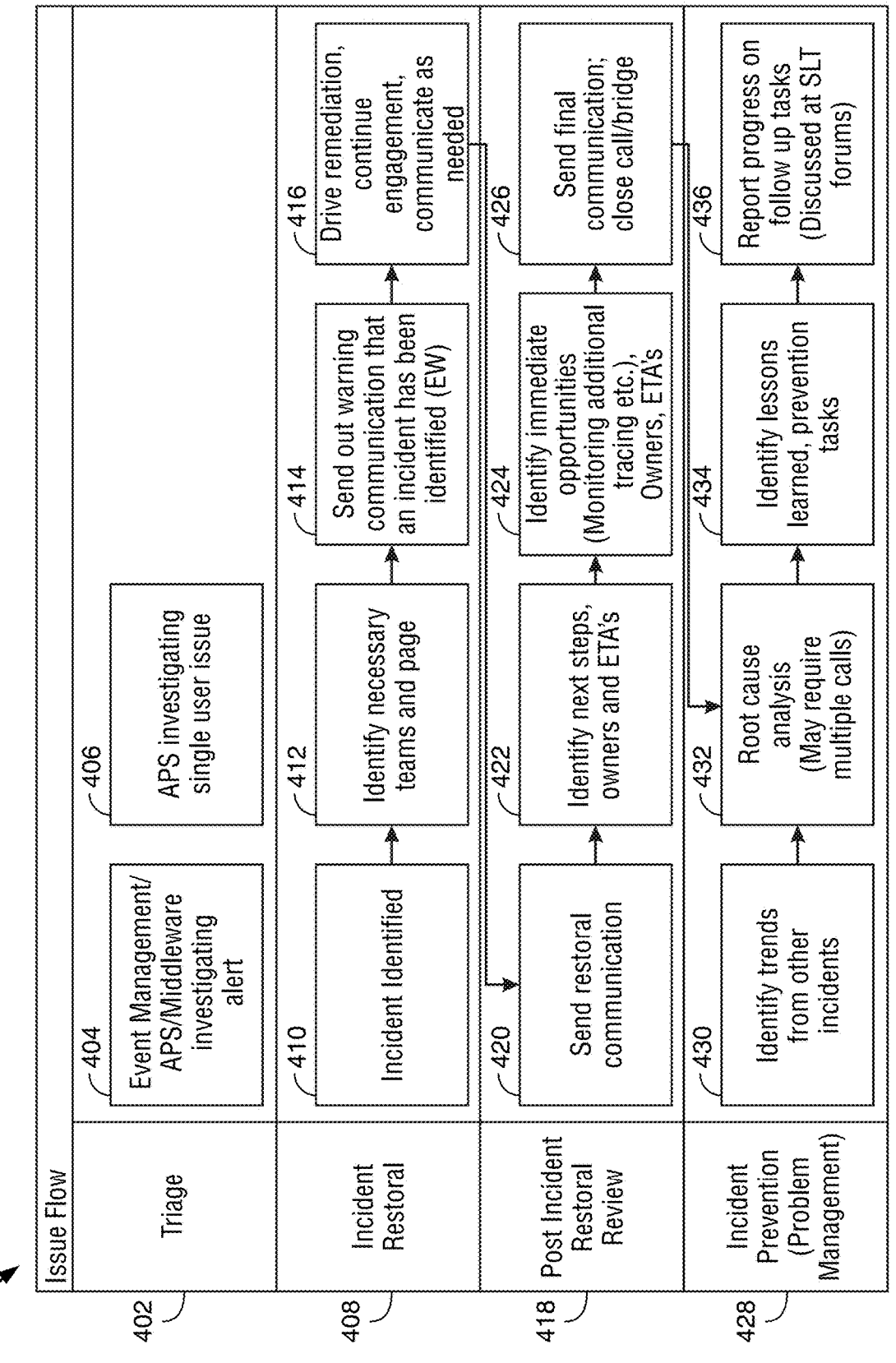
FIG. 4 shows another illustrative flow diagram in accordance with the principles of the disclosure.

FIG. 4 shows an illustrative flow diagram of issue flow 400 in a life cycle bridge in accordance with the principles of the disclosure. Swim lanes 402, 408, 418, and 428 are shown in issue flow 400. Specifically, issue flow includes triage lane 402, incident restoral lane 408, post incident restoral review lane 418 and incident prevention (problem management) lane 428.

Triage lane 402 includes an entry for event management/ Application Production Services "APS"/middleware investigating alert 404. Triage lane 402 also includes an entry involving an APS dedicated to investigating a single-user issue 406.

Incident restoral lane 408 includes incident identification 410, identification of necessary teams and pages 412, and one or more relevant responders release of a warning communication 414 that an incident has been identified. Finally, incident restoral lane 408 shows driving remediation, continuing engagement and communicating as needed 416.

At this point, post incident restoral review lane 418 is invoked. Post-incident restoral review 418, which continues from driving remediation, etc., shows sending restored communication 420 followed by (or substantially simultaneously thereto) identifying next steps, owners of incidents, and estimated times of arrival (ETAs) for follow-up communications 422.

Thereafter, post incident restoral review 418 may include identifying immediate opportunities (monitoring, additional tracking, etc.) owners of same and ETAs for same 424.

Finally, post incident restoral review 418 may include sending a final communication, and closing the call or bridge 426.

A swim lane dedicated to incident prevention (problem management) 428 may follow post-incident rostral review 418. Incident prevention 428 may include root call analysis. Root cause analysis may receive input from the final communication close call. Root cause analysis may retrieve trends as identified as desired from other incidents 430. Root cause analysis may require multiple calls to fully obtain information for the root cause 432.

It should be noted that, in some embodiments, the final communication and/or closing the call or bridge 426 may be timed to coincide with the average time of expiry for a call or bridge associated with the same root cause as the current event.

Root cause analysis may further identify trends and lessons learned as well as tasks for prevention of future outage incidents 434. Root cause analysis may also provide a progress report reflective of follow-up tracks discussed at SLT forums 436 (Senior Leadership Team), a venue to discuss various topics with management team.

Figure 5:
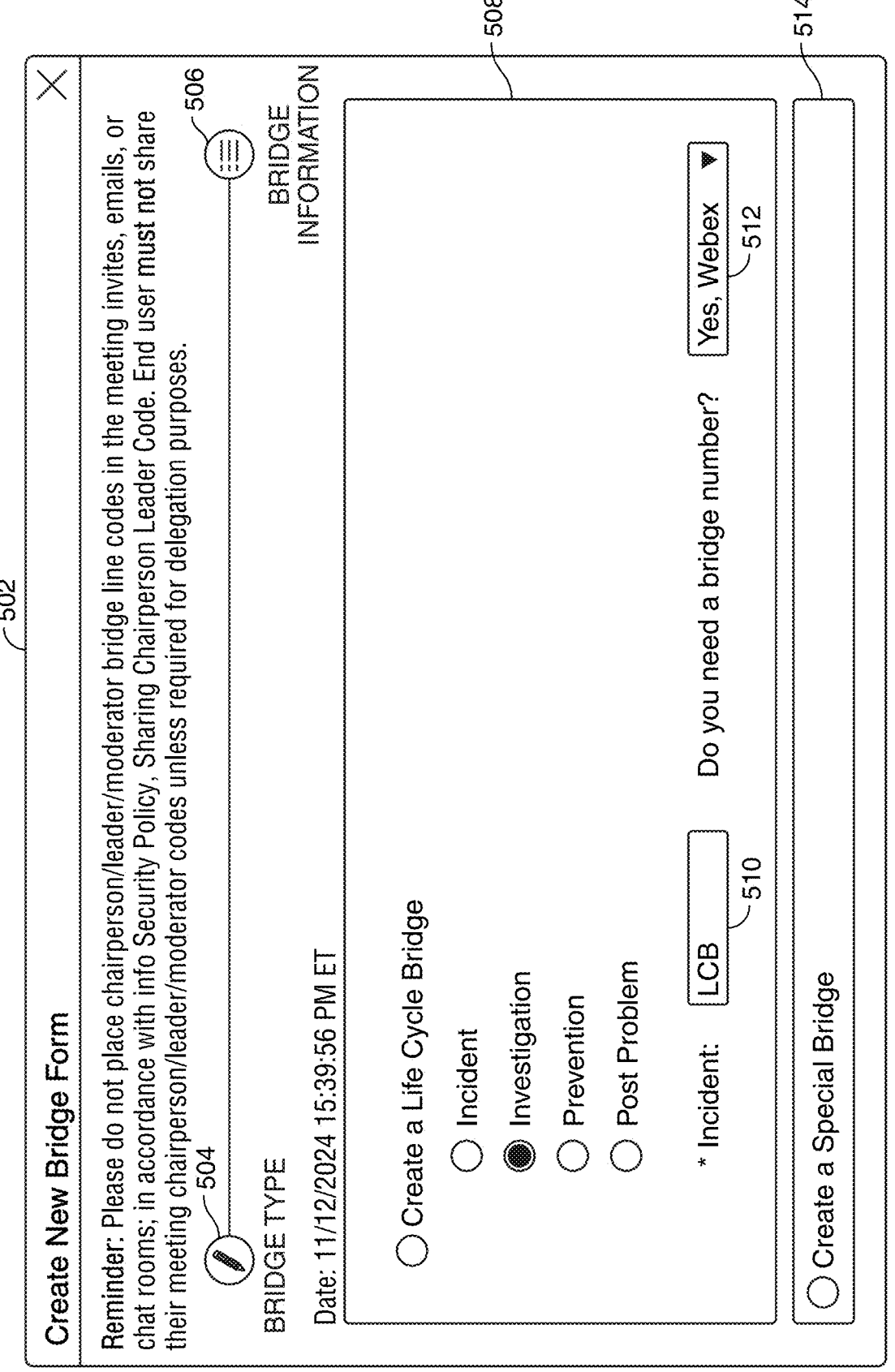
FIG. 5 shows an illustrative interactive graphical user interface ("GUI") in accordance with the principles of the disclosure.

FIG. 5 shows an illustrative interactive graphical user interface ("GUI") in accordance with the principles of the disclosure.

FIG. 5 also shows a GUI 502 for creating a new bridge form.

More specifically, triage lane 402 (in FIG. 4) may include an entry prompt for the disclosure of the incident or event. At 504, there is a prompt for the user to enter the bridge type for use with the overall life cycle bridge (LCB). At 506, bridge information is entered. At 508-a life cycle bridge entry screen is displayed.

The GUI 502 is generated with an indication that it is system-defined as an LCB. The user may be prompted, at 512, to select whether a bridge number (for entry into a storage location for LCBs) is requested, and, if so, then a definition as to technological requirements for the bridge— e.g., a selection of a Webex bridge—is also requested. At 514, a user maybe be prompted to select as to whether the event requires a special bridge.

In other words, creating a life cycle bridge may include creating an incident bridge, an investigation bridge, a prevention bridge and/or a post-problem bridge.

Creating a new bridge may, alternatively, involve creating a special bridge.

FIG. 6 shows another illustrative bridge detail report 602 in accordance with the principles of the disclosure. Illustrative bridge detail report 602 may include a bridge details section 604, reservation information 606, ticket information 608, criticality information 610, personnel information 612 and bridge facts 614.

Items listed on illustrative bridge detail report 602 are set forth in table 1.

TABLE 1

| Brief Description |
| --- |
| Customer Experience |
| Status Update |
| Reservation Call Type |
| Webex |
| Workroom/Matter Most |
| Heightened Awareness |
| Priority |
| Impact |
| Urgency |
| Special Event |
| Call Leader |
| Incident Manager |
| Region |
| Domains Involved |
| Linked Ticket ID |
| Impacted AIT |
| Impact Status |
| Owned By |
| Caused by Charge |
| Event Status |
| Bridge Start |
| In Recess |
| Network Engaged |

Figure 7:
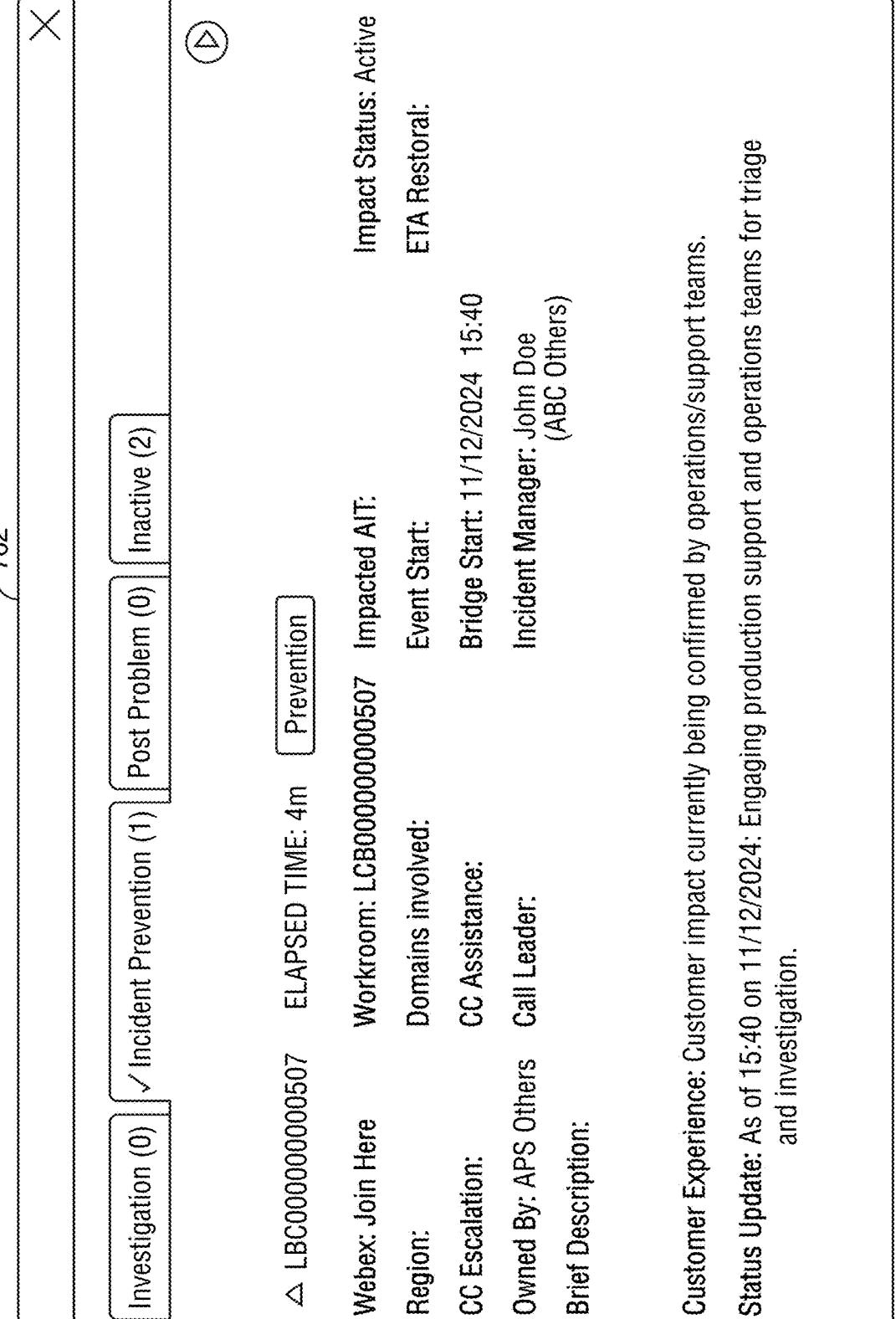
FIG. 7 shows an illustrative bridge screen in accordance with the principles of the disclosure.

FIG. 7 shows an illustrative bridge screen 702 in accordance with the principles of the disclosure. Specifically, illustrative bridge screen 702 may preferably be directed to incident prevention.

Items included in illustrative bridge screen 702 are set forth in Table 2.

TABLE 2

| Investigation |
| --- |
| Incident Prevention |
| Post Problem |
| Inactive |
| Webex |
| Region |
| Escalation |
| Owned By |

TABLE 2-continued

| Brief Description |
| --- |
| Customer Experience |
| Status Update |
| Workroom |
| Domain Involved |
| Assistance |
| Call Leader |
| Impacted AIT |
| Event Start |
| Bridge Start |
| Incident Manager |
| Impact Status |
| ETA Restored |

FIG. 8 shows an illustrative group information screen 802.

More specifically, FIG. 8 shows group information screen 802 including a group descriptor GUI. At 804, bridge details are displayed. At 806, responders for on-call information are displayed.

Items included in FIG. 8 are set forth in Table 3 below:

TABLE 3

| Group Name |
| --- |
| Group Description |
| Group Manager |
| Special Instructions |
| Level of Team Member |
| Name of Team Member |
| Status of Team Member |

Figure 9:
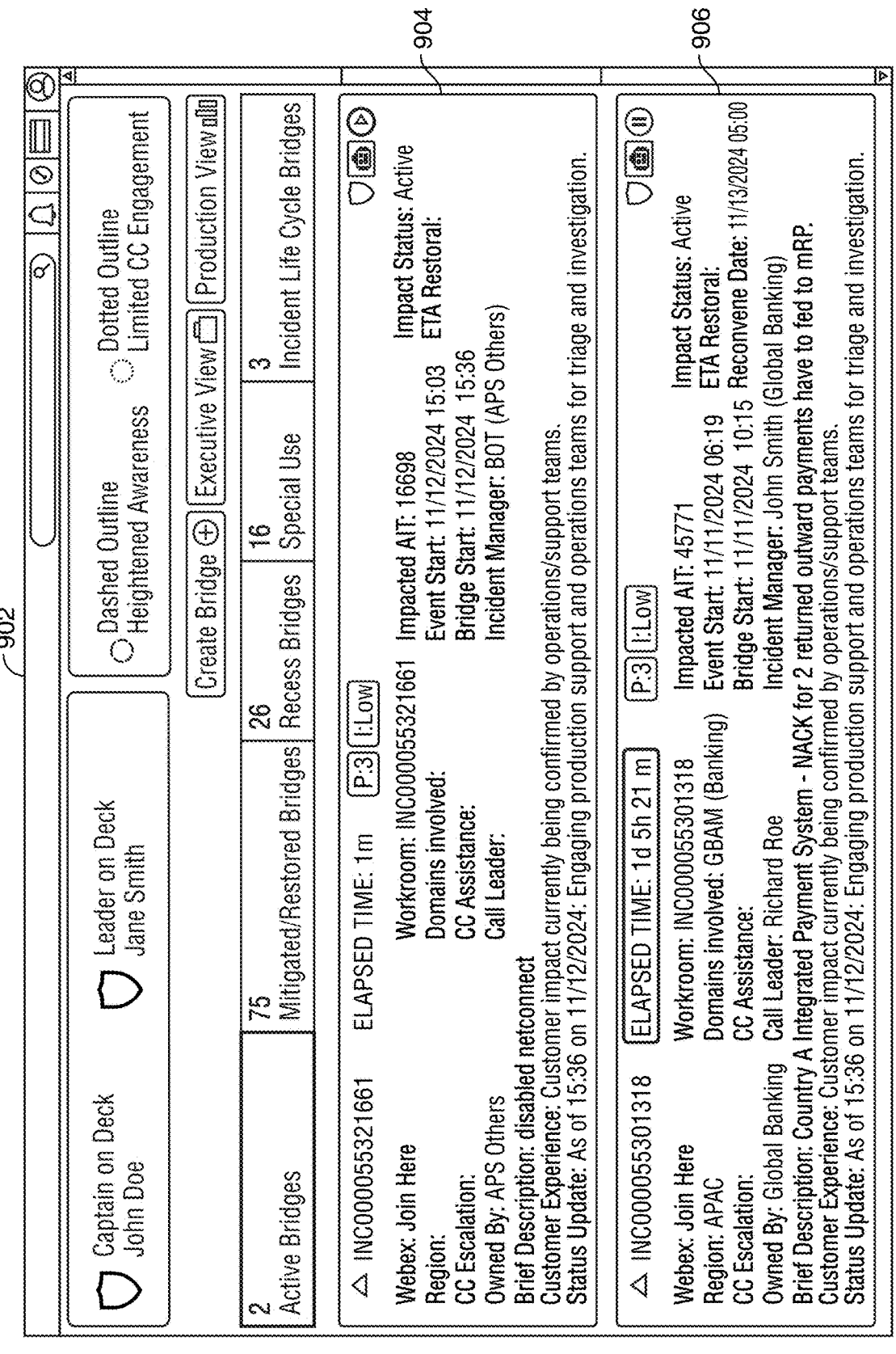
FIG. 9 shows an illustrative bridge screen in accordance with the principles of the disclosure.

FIG. 9 shows an illustrative aggregate bridge screen 902 in accordance with the principles of the disclosure. Illustrative aggregate bridge screen 902 shows multiple bridge screens 904, 906 preferably stacked one on top of the other in a vertical arrangement. Other arrangements of groups of bridge screens 904, 906 are also contemplated as part of this disclosure. Such arrangements may be either system-set, or user-defined, at least in order to customize the display to a user preference.

In certain embodiments, a number and/or level of responders requested by an electronic bridge according to the disclosure may depend on the criticality, public-facing nature and/or the size of the outage—e.g., the percentage amount of the network affected or the number of devices affected. In certain embodiments, the number and/or level of responders may vary proportionally with the size of the outage.

In certain embodiments, a number and/or level of responders requested by an electronic bridge according to the disclosure may depend on the criticality, public-facing nature and/or the number of systems affected by the outage—e.g., software systems, hardware systems, hybrid software/hardware systems, customer-facing systems, non-customer facing systems, etc. In certain embodiments, the number and/or level of responders may vary proportionally with the number of systems affected by the outage.

As described above, certain embodiments may involve the selection of respondents along a two-dimensional array of responders. In such embodiments, both the level of the respondents, with respect to each of the respondents' level of technical acuity or other suitable characteristic, may form one dimension of the array, while the total number of selected respondents may form another dimension of the array. Thus, a request for respondents may vary along two dimensions. In some embodiments of the disclosure, more than two dimensions may be relevant to selection of respondents, and is, in fact, within the scope of the disclosure.

Figure 10B:
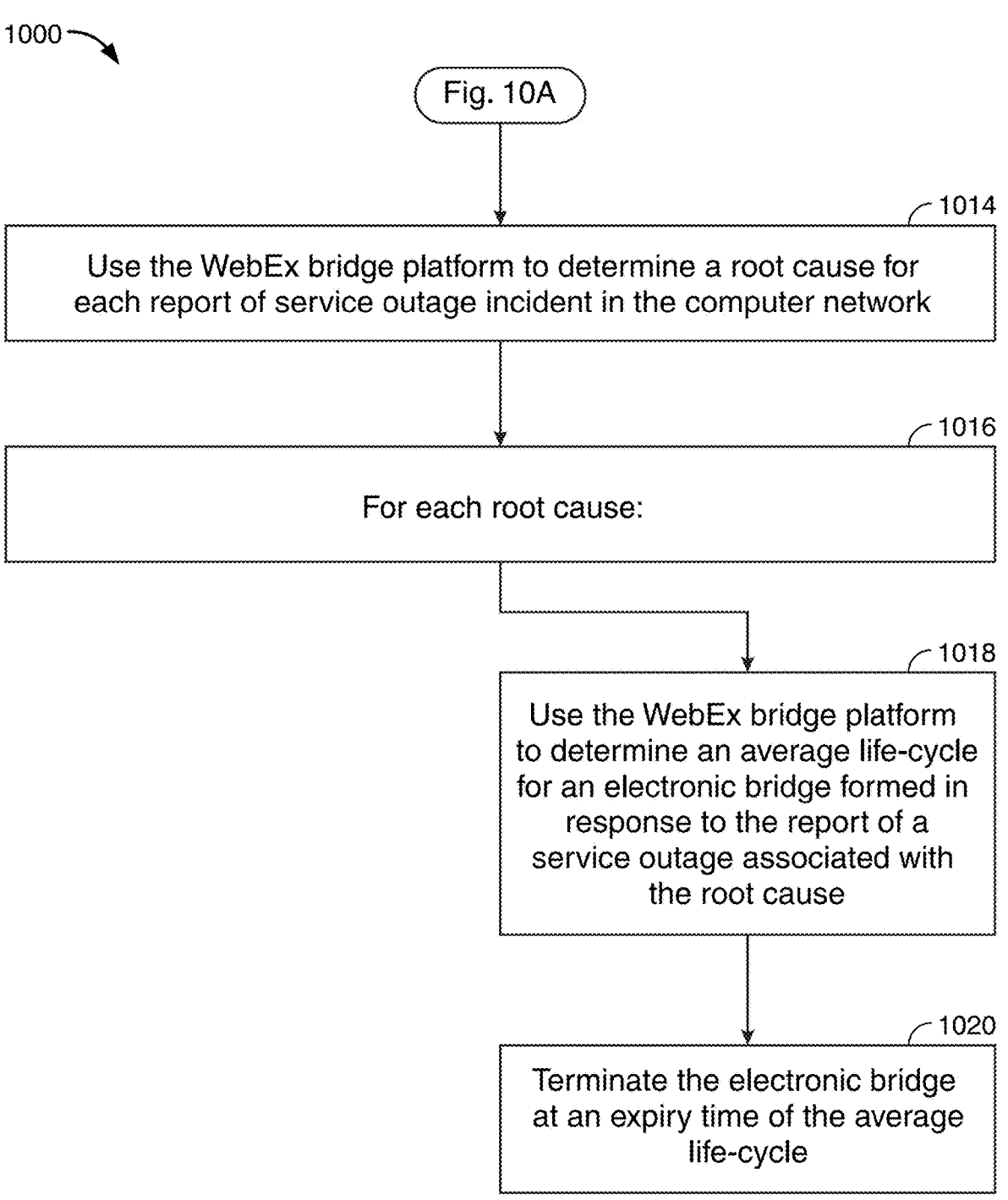

FIGS. 10A-B shows an illustrative flow diagram according to the principles of the disclosure. At 1002, a step of receiving a report of a service outage incident in a computer network is shown. At 1004, the method arranges a life-cycle electronic bridge to serve as an electronic staging area to respond to the service outage incident is shown.

At 1006, the method shows transmitting an API call to a WebEx bridge platform for all bridge information available in the computer network. The bridge information may include all of a plurality of electronic bridges that are currently being hosted by the WebEx bridge platform. The bridge information may further identify a plurality of responders that are currently involved in at least one of the plurality of electronic bridges.

Step 1006 may identify, using the processor in electronic communication with the WebEx bridge platform, a set of responders that are capable and available for responding to the incident, that are not listed among the plurality of responders that are currently involved in at least one of the plurality of electronic bridges, and that are electronically listed on the WebEx bridge platform.

Step 1010 involves using the WebEx bridge platform to send an electronic prompt to at least one of the set of responders to join the electronic bridge. At step 1012, the method adds the life-cycle electronic bridge to the plurality of electronic bridges that are currently being hosted by the WebEx bridge platform.

At 1014, the WebEx bridge platform may be used to determine a root cause for each report of service outage incident in the computer network. Then, for each root cause (see 1016), the WebEx bridge platform may be used to determine an average life-cycle for an electronic bridge formed in response to the report of a service outage associated with the root cause, as shown at 1018. Finally, the method may terminate the electronic bridge at an expiry time corresponding to the average life-cycle, as shown at 1020.

Figures 11A, 11B:
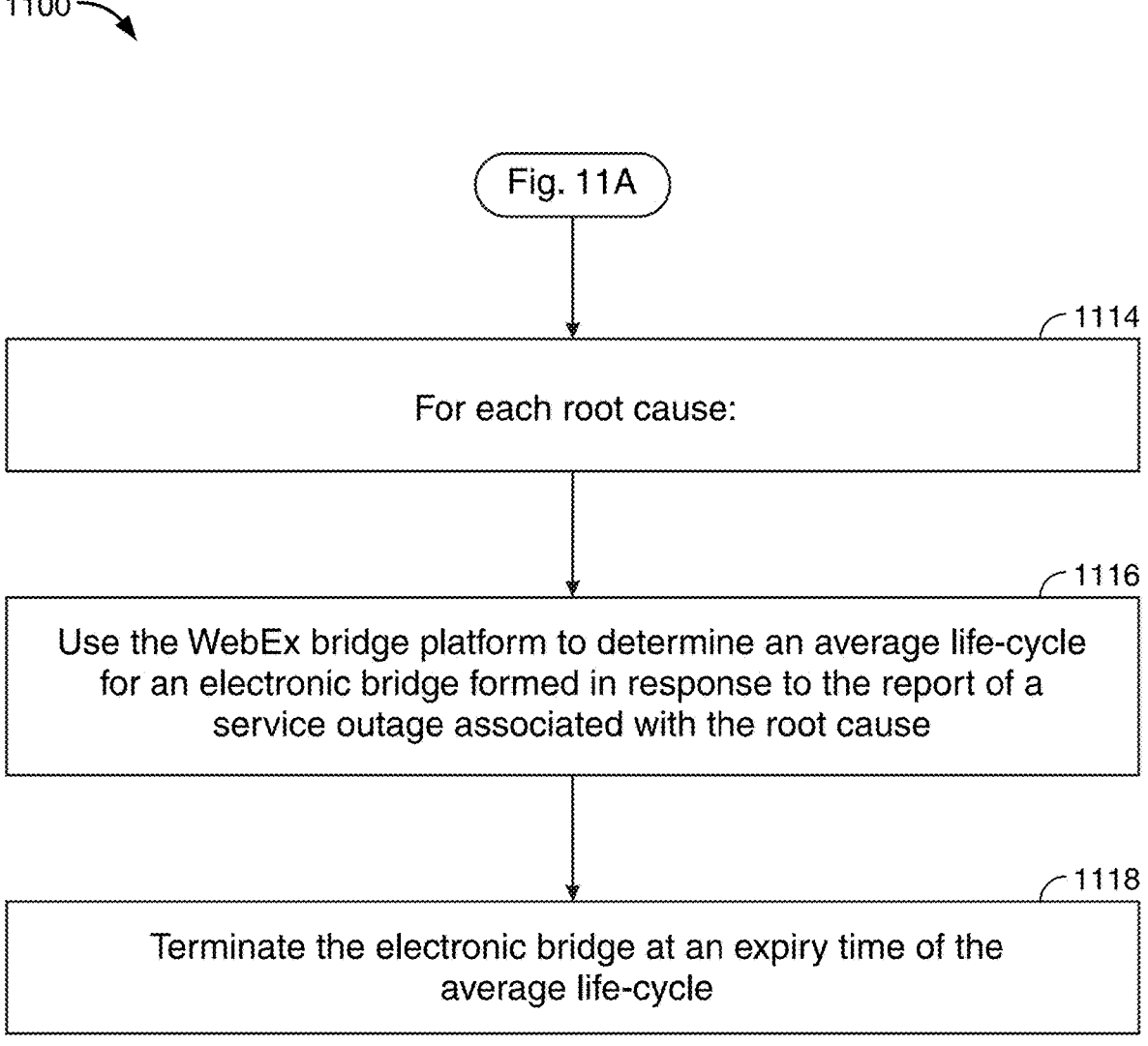
FIGS. 11A-B shows other illustrative flow diagrams according to the principles of the disclosure.

FIGS. 11A-B shows another illustrative flow diagram according to the principles of the disclosure. At 1102, the diagram shows a first part of a method, describing receiving a report of a service outage incident in a computer network. At 1104, the method shows arranging an LCB to serve as an electronic staging area to respond to the service outage incident.

The method then transmits an API call to a WebEx bridge platform for all bridge information available in the computer network. The bridge information may include electronic bridges that are currently being hosted by the WebEx bridge platform as well as responders that are currently involved in at least one electronic bridge.

At 1108, the WebEx bridge platform may be used to send an electronic prompt to the responders that are not involved in an electronic bridge to join the electronic bridge.

At 1110, the LCB may be added to the electronic bridges that are currently being hosted by the WebEx platform.

Thereafter, the WebEx platform may determine a root cause for each report of service outage incident in the computer network, as shown at 1112.

At 1114-1116, the root cause determination may be used by the WebEx platform to determine an average life-cycle for an electronic bridge formed in response to the report of a service outage associated with the root cause, and 1118 shows terminating the electronic bridge at an expiry time of the average-life cycle, preferable independently of activity on the bridge. It should be noted that, to the extent that activity on the bridge exceeds a pre-determined threshold termination may be overridden, or responders may be prompted to restart the bridge and/or reset the bridge to a previous level of operation.

Thus, methods and apparatus for providing are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for providing virtual monitoring of a set of computing devices, the method comprising:

receiving, using a receiver, a report of a service outage incident in a computer network;

arranging a life-cycle electronic bridge to serve as an electronic staging area to respond to the service outage incident;

transmitting, using a transmitter, an Application Programming Interface (API) call to a WebEx bridge platform for all bridge information available in the computer network, said bridge information that comprises all of a plurality of electronic bridges that are currently being hosted by the WebEx bridge platform, and a plurality of responders that are currently involved in at least one of the plurality of electronic bridges;

identifying, using the processor in electronic communication with the WebEx bridge platform, a set of responders that are capable of responding to the incident, that are not listed among the plurality of responders that are currently involved in at least one of the plurality of electronic bridges, and that are electronically listed on the WebEx bridge platform as available to join electronic bridge;

using the WebEx bridge platform to send an electronic prompt to the at least one of the set of responders to join the electronic bridge;

adding the life-cycle electronic bridge to the plurality of electronic bridges that are currently being hosted by the WebEx bridge platform;

using the WebEx bridge platform to determine a root cause for each report of service outage incident in the computer network;

for each root cause:

using the WebEx bridge platform to determine an average life-cycle for an electronic bridge formed in response to the report of a service outage associated with the root cause; and terminating the electronic bridge at an expiry time of the average life-cycle.

2. The method of claim 1, wherein the average life-cycle comprises a bridge start date/time and a bridge expiry date/time.

3. The method of claim 2, the method further comprising determining, between the start date/time and the bridge expiry date/time, peak activity intervals.

4. The method of claim 1, further comprising, prior to the arranging of the electronic bridge, determining, for each root cause, whether a legacy electronic bridge exists that relates to each root cause.

5. The method of claim 1, wherein, when the legacy electronic bridge that relates to a root cause exists, then classifying the legacy electronic bridge that relates to the root cause as relational to the root cause, and flagging the legacy electronic bridge with a root cause flag, said root cause flag that identifies the root cause of the legacy electronic bridge.

6. The method of claim 5, further comprising adding the legacy electronic bridge that relates to the root cause to a plurality of legacy electronic bridges that relate to the root cause.

7. A system comprising one or more non-transitory computer-readable media storing computer-executable instructions which, when executed by a processor on a computer system, perform virtual monitoring of a set of computing devices, the system comprising:

a receiver for receiving a report of a service outage incident in a computer network;

a life-cycle electronic bridge, said life-cycle electronic bridge arranged to serve as an electronic staging area to respond to the service outage incident;

a transmitter for transmitting an Application Programming Interface (API) call for all bridge information available in the computer network;

a WebEx bridge platform, said WebEx bridge platform for receiving the API call for bridge information, said bridge information that comprises all of a plurality of electronic bridges that are currently being hosted by the WebEx bridge platform, and for a plurality of responders that are currently involved in at least one of the plurality of electronic bridges;

wherein the processor is in electronic communication with the WebEx bridge platform, a set of responders that are capable of responding to the incident, that are not listed among the plurality of responders that are currently involved in at least one of the plurality of electronic bridges, and that are electronically listed on the WebEx bridge as available to join the life-cycle electronic bridge;

the WebEx bridge platform is further configured to send an electronic prompt to the at least one of the set of responders to join the life-cycle electronic bridge;

the WebEx bridge platform is further configured to add the life-cycle electronic bridge to the plurality of electronic bridges that are currently being hosted by the WebEx bridge platform;

the processor is further configured to determine a root cause for each report of service outage incident in the computer network;

for each root cause:

the WebEx bridge platform is configured to determine an average number of responders for an electronic bridge formed in response to the report of a service outage associated with the root cause, and based on the determination, adjust the response to the API call to be in electronic communication to obtain the average number of responders;

using the WebEx bridge platform to determine an average life-cycle for an electronic bridge formed in response to the report of a service outage associated with the root cause; and terminating the electronic bridge at an expiry time of the average life-cycle.

8. The system of claim 7, wherein the average life-cycle comprises a bridge start date/time and a bridge expiry date/time.

9. The system of claim 8, wherein the WebEx bridge platform is further configured to determine, between the bridge start date/time and the bridge expiry date/time, peak activity intervals.

10. The system of claim 7, wherein the WebEx bridge platform is further configured to determine, prior to the arranging of the electronic bridge, for each root cause, whether a legacy electronic bridge exists that relates to each root cause.

11. The system of claim 7, wherein, when a legacy electronic bridge that relates to a root cause exists, the WebEx bridge platform is further configured to classify the legacy electronic bridge that relates to the root cause as relational to the root cause, and flagging the legacy electronic bridge with a root cause flag, said root cause flag that identifies the root cause of the legacy electronic bridge.

12. The system of claim 11, wherein the WebEx bridge platform is further configured to add the legacy electronic bridge that relates to the root cause to a plurality of legacy electronic bridges that relate to the root cause.

13. One or more non-transitory computer-readable media storing computer-executable instructions which, when executed by a processor on a computer system, perform a method for providing virtual monitoring of a set of computing devices, the method comprising:

receiving, using a receiver, a report of a service outage incident in a computer network;

arranging a life-cycle electronic bridge to serve as an electronic staging area to respond to the service outage incident;

transmitting, using a transmitter, an Application Programming Interface (API) call to a WebEx bridge platform for all bridge information available in the computer network, said bridge information that comprises all of a plurality of electronic bridges that are currently being hosted by the WebEx bridge platform, and a plurality of responders that are currently involved in at least one of the plurality of electronic bridges;

identifying, using the processor in electronic communication with the WebEx bridge platform, a set of responders that are capable of responding to the incident, that are not listed among the plurality of responders that are currently involved in at least one of the plurality of electronic bridges, and that are electronically listed on the WebEx bridge platform as available to join electronic bridge, said identifying comprising forming an array of responders based on a number and a qualification level of the responders and, in response to receiving a greater than threshold level of a pre-determined metric associated with the service outage incident, proportionally to the pre-determined metric, increasing the number and qualification level of the responders, said array of responders being selected from a group of responders that is larger than the array of responders;

using the WebEx bridge platform to send an electronic prompt to the at least one of the set of responders to join the electronic bridge;

adding the life-cycle electronic bridge to the plurality of electronic bridges that are currently being hosted by the WebEx bridge platform;

using the WebEx bridge platform to determine a root cause for each report of service outage incident in the computer network;

for each root cause:

using the WebEx bridge platform to determine an average life-cycle for an electronic bridge formed in response to the report of a service outage associated with the root cause; and terminating the electronic bridge at an expiry time of the average life-cycle.

14. The method of claim 13, the increasing comprising increasing proportionally to a percentage amount of the computer network affected by the service outage incident, the number and/or qualification level of the responders.

15. The method of claim 13, the increasing comprising increasing proportionally to a percentage amount of the computer network affected by the service outage incident the number and/or qualification level of the responders.

16. The method of claim 13, the increasing comprising increasing proportionally to a percentage amount of computer systems in the computer network affected by the service outage incident the number and/or qualification level of the responders.

17. The method of claim 13, the increasing comprising increasing proportionally to a magnitude of types of systems affected by the service outage incident the number and/or qualification level of the responders.

18. The method of claim 13, the increasing comprising increasing proportionally to a criticality of systems affected by the service outage incident the number and/or qualification level of the responders.

19. The method of claim 18 wherein the criticality of systems is determined based at least in part on whether the systems are end consumer-facing or not.

* * * * *